United States Patent
Ivarsson et al.

(10) Patent No.: US 11,788,479 B2
(45) Date of Patent: Oct. 17, 2023

(54) INTERNAL COMBUSTION ENGINE COMPRISING A DECENTRALIZED VALVE-CONTROL ARRANGEMENT AND METHOD THEREFOR

(71) Applicant: FREEVALVE AB, Ängelholm (SE)

(72) Inventors: Lars Ivarsson, Eket (SE); Eric Griess, Viken (SE)

(73) Assignee: FREEVALVE AB, Ängelholm (SE)

( * ) Notice: Subject to any disclaimer, the term of this patent is extended or adjusted under 35 U.S.C. 154(b) by 0 days.

(21) Appl. No.: 17/908,848

(22) PCT Filed: Mar. 1, 2021

(86) PCT No.: PCT/SE2021/050166
§ 371 (c)(1),
(2) Date: Sep. 1, 2022

(87) PCT Pub. No.: WO2021/177877
PCT Pub. Date: Sep. 10, 2021

(65) Prior Publication Data
US 2023/0103945 A1 Apr. 6, 2023

(30) Foreign Application Priority Data
Mar. 2, 2020 (SE) .................................. 2050229-0

(51) Int. Cl.
*F02D 13/02* (2006.01)
*F01L 9/16* (2021.01)
*F01L 9/40* (2021.01)

(52) U.S. Cl.
CPC ............ *F02D 13/0253* (2013.01); *F01L 9/16* (2021.01); *F01L 9/40* (2021.01); *F01L 2820/045* (2013.01)

(58) Field of Classification Search
CPC ....... F01L 9/10; F01L 9/16; F01L 9/40; F01L 2820/045; F02D 13/0253
See application file for complete search history.

(56) References Cited

U.S. PATENT DOCUMENTS

| 6,278,932 B1 | 8/2001 | Bäumel et al. |
| 10,577,988 B2 * | 3/2020 | Hoglund ................ F01B 21/02 |

(Continued)

FOREIGN PATENT DOCUMENTS

| SE | 1451233 A1 * | 4/2016 |
| WO | 2015/160304 | 10/2015 |

OTHER PUBLICATIONS

International Search Report for PCT/SE2021/050166 dated Mar. 26, 2021, 7 pages.

(Continued)

*Primary Examiner* — Ngoc T Nguyen
(74) *Attorney, Agent, or Firm* — NIXON & VANDERHYE (57) ABSTRACT

Disclosed is an internal combustion engine including: an actuator for axial displacement of at least one gas exchange valve of the internal combustion engine, wherein the actuator includes: an actuator piston disc, a cylinder volume adapted for the actuator piston disc, wherein the actuator piston disc is movably arranged in an axial direction between a rest position and an active position, wherein the position sensor arrangement is configured for determining the position of the at least one gas exchange valve, the at least one gas exchange valve being displaced by the movement of the actuator piston disc, and a local control unit associated with the actuator, wherein the local control unit is operatively connected to the at least one controllable inlet valve and the controllable outlet valve of the actuator and operatively connected to the position sensor arrangement.

20 Claims, 7 Drawing Sheets

(56) References Cited

U.S. PATENT DOCUMENTS

| | | |
|---|---|---|
| 2002/0072845 A1 | 6/2002 | Eichenseher et al. |
| 2003/0183202 A1 | 10/2003 | Mischker et al. |
| 2010/0018481 A1 | 1/2010 | Gelez et al. |
| 2010/0307433 A1 | 12/2010 | Rust et al. |
| 2015/0247718 A1 | 9/2015 | Hoglund |
| 2016/0237864 A1* | 8/2016 | Hoglund .................. F02F 1/24 |

OTHER PUBLICATIONS

Written Opinion of the ISA for PCT/SE2021/050166 dated Mar. 26, 2021, 7 pages.

* cited by examiner

INTERNAL COMBUSTION ENGINE COMPRISING A DECENTRALIZED VALVE-CONTROL ARRANGEMENT AND METHOD THEREFOR

CROSS-REFERENCE FOR RELATED APPLICATIONS

This application is the U.S. national phase of International Application No. PCT/SE2021/050166 filed Mar. 1, 2021 which designated the U.S. and claims priority to SE 2050229-0 filed Mar. 2, 2020, the entire contents of each of which are hereby incorporated by reference.

BACKGROUND OF THE INVENTION

Field of the Invention

The present invention relates in general to a free moving valve arrangement for an internal combustion engine and a method for controlling a free moving valve arrangement for an internal combustion engine.

Description of the Related Art

In a camshaft free internal combustion engine a pressure fluid, such as a liquid or a gas, is used to achieve a displacement/opening of one or more engine valves. This means that the camshafts, and related equipment, that conventional combustion engines uses to open engine valves to let air in respective let exhaust fumes out from the combustion chamber, has been replaced by a less volume demanding and more controllable system.

In an engine that is constructed for significant angular momentum outputs, the pressure in the combustion chamber is increasing proportional to an increased angular momentum output, and the force that is required to open the valve actuator to open the, in relation to the combustion chamber inward opening, engine valve is consequently also increases proportional to an increased angular momentum output. At high numbers of revolutions, such as 6-8000 rpm, a very fast opening of the engine valve is also required for the filling of air respective evacuation of exhaust fumes from the engine cylinder not to be restricted. These requirements, i.e. the need for an extremely fast opening at high frequencies in a high performance engine having high counter pressure in the combustion chamber of the engine at the opening of the exhaust valves, require the pressure of the pressure fluid upstream of the valve actuator to be high, in the order of 8-30 bar.

There is a need in the art for controlling and adjusting the opening position and/or a total valve lift of such a free moving valve in an internal combustion engine which can be performed quick and reliably.

SUMMARY OF THE INVENTION

An object of the present invention is to provide for a free moving valve arrangement for an internal combustion engine which provides for a solution to the problem of controlling and adjusting its opening position and/or total valve lift. It is another object of the present invention to provide a method for controlling and adjusting the opening position and/or total valve lift of such a free moving valve arrangement.

According to a first aspect of the present invention, there is provided an internal combustion engine comprising:

an actuator for axial displacement of at least one gas exchange valve of said internal combustion engine, wherein said actuator comprises:
an actuator piston disc 20,
a cylinder volume adapted for said actuator piston disc 20, wherein said actuator piston disc 20 divides said cylinder volume in a first portion 22 and a second portion 23, wherein said actuator piston disc 20 is movably arranged in an axial direction between a rest position and an active position,
an actuator piston rod 80 connected to said actuator piston disc 20 for guiding said actuator piston disc 20 in an axial direction,
an inlet channel 70 arranged between a pressure fluid inlet 11 and the first portion 22 of the cylinder volume,
at least one controllable inlet valve 26, 50 arranged in said inlet channel 11,
an outlet channel 60 arranged between said first portion 22 of the cylinder volume and a pressure fluid outlet 12,
a controllable outlet valve 27 arranged in said outlet channel 60,
a position sensor arrangement associated with said actuator, wherein the position sensor arrangement is configured for determining the position of said at least one gas exchange valve, said at least one gas exchange valve being displaced by the movement of said actuator piston disc 20, and
a local control unit 87 associated with said actuator, wherein the local control unit 87 is operatively connected to said at least one controllable inlet valve 26, 50 and said controllable outlet valve 27 of the actuator 10 and operatively connected to said position sensor arrangement, the entire or part of the local control unit 87 is attached to said actuator 10 or in close vicinity to said actuator 10, the local control unit 87 is configured for controlling the opening and closing of said at least one controllable inlet valve 26, 50 and said at least one controllable outlet valve 27 by operating respective electromagnetic solenoids 91, 92, 94,
wherein said local control unit 87 is configured for receiving information from an engine control unit ECU.

An advantage of the present invention is that by decentralize control functionality from the engine control unit to a local control unit attached to or in close vicinity to an actuator to be controlled, said control functionality may be further enhanced with respect to control signal quality and/or control signal speed. Another advantage of the present invention is that the engine control software and said local control software may be developed independently of each other.

Yet another advantage of the present invention is that the complexity of the engine control unit is decreased which in turn may reduce initial development costs as well as further upgrade costs.

In various example embodiments said local control unit 87 is configured for controlling the opening and closing of said at least one controllable inlet valve 26, 50 and said at least one controllable outlet valve 27.

An advantage of this embodiment is that the control of the actuator is enhanced by providing the control unit in close proximity of the actuator. In such arrangement the control signals back and forth from the actuator may be performed with few disturbing elements and also in quickest possible way.

In various example embodiments said local control unit 87 is configured for determining a measured value of at least one of:
- time of opening of said at least one gas exchange valve of said internal combustion engine,
- time of closing of said at least one gas exchange valve of said internal combustion engine, and
- lift height of said at least one gas exchange valve of said internal combustion engine.

The advantage of this embodiment is that the actuator monitoring and actuator management may be performed individually for each actuator. In various example embodiments a warning signal may be sent out from the local control unit if the measured value is outside a predetermined measured value interval. This warning signal may in turn result in closing down fuel injection for the corresponding cylinder, i.e. the operation of said cylinder, and/or closing down the functionality of the faulty actuator. In such a way one cylinder of the internal may be deactivated from measurement made locally at a specific actuator.

In various example embodiments according said measured value is a mean value, median value or type value based on 2-30 events, wherein one event comprises at least one opening and closing of said at least one gas exchange valve of said internal combustion engine.

The advantage of this embodiment is that quick correction may be performed by not using to much data and at the same time cleaning/filtering out extraordinary abnormalities.

In various example embodiments said local control unit is configured to compare each measured value with a corresponding predetermined value, wherein said local control unit is configured to correct any deviation between each mean value and the corresponding predetermined value by adjusting at least one of opening time of said at least one controllable inlet valve 26, 50, closing time of said at least one controllable inlet valve 26, 50 and/or opening time of said at least one controllable outlet valve 27.

An advantage of this embodiment is that the actuator is a self-regulating unit with hardware and intelligent software. This is especially advantageous when a plurality of such units are used simultaneously in an internal combustion engine. The self-adjustment in one actuator is not interfering with any self-adjustment in any other actuator in the same internal combustion engine.

In various example embodiments said position sensor arrangement for determining the position of said at least one gas exchange valve of said internal combustion engine is an inductive sensor, a capacitive sensor, an eddy current sensor and/or a mechanical sensor.

An advantage of this embodiment is that the sensor arrangement may be arranged in close proximity to the local control unit. Said local control unit may be configured to detect signals emanating from said sensor arrangement.

In various example embodiment said information from the engine control unit ECU comprises at least predetermined values for time of opening, time of closing and lift height of said at least one gas exchange valve of said internal combustion engine.

An advantage of this embodiment is that the complexity of the ECU may be reduced by decentralize intelligence from the ECU to the local control unit, where said ECU and local control unit may be in direct or indirect contact with each other.

In various example embodiments the internal combustion engine further comprising an intermediate control unit arranged in-between said local control unit and said engine control unit ECU, wherein said intermediate control unit is configured for receiving information from the engine control unit ECU and for distributing control signals to each local control unit of said internal combustion engine.

An advantage of this embodiment is that the complexity of the ECU may further be reduced by decentralize intelligence from said ECU to said intermediate control unit.

In various example embodiments said pressure fluid outlet 12 may be arranged for directing pressure fluid onto said local control unit 87 for cooling the same.

An advantage of this embodiment is that no extra cooling device is necessary since one can use the already existing flow of gas pressure emanating from the actuator for cooling the local control unit.

In another aspect of the present invention it is provided a method for controlling an internal combustion engine comprising an actuator for axial displacement of at least one gas exchange valve of said internal combustion engine, wherein said actuator comprises:
- an actuator piston disc 20,
- a cylinder volume adapted for said actuator piston disc 20, wherein said actuator piston disc 20 divides said cylinder volume in a first portion 22 and a second portion 23, wherein said actuator piston disc 20 is movably arranged in an axial direction between a rest position and an active position,
- an actuator piston rod 80 connected to said actuator piston disc 20 for guiding said actuator piston disc 20 in an axial direction,
- an inlet channel 70 arranged between a pressure fluid inlet 11 and the first portion 22 of the cylinder volume,
- at least one controllable inlet valve 26, 50 arranged in said inlet channel 70,
- an outlet channel 60 arranged between said first portion 22 of the cylinder volume and a pressure fluid outlet 12,
- a controllable outlet valve 27 arranged in said outlet channel 60, said method comprising the steps of:
- determining, by means of a position sensor arrangement associated with said actuator, the position of said at least one gas exchange valve, said at least one gas exchange valve being displaced by the movement of said actuator piston disc 20,
- determining, by means of said local control unit associated with said actuator, a measured value of at least one of:
  - time of opening of said at least one gas exchange valve of said internal combustion engine,
  - time of closing of said at least one gas exchange valve of said internal combustion engine, and
  - lift height of said at least one gas exchange valve of said internal combustion engine,
- comparing, by means of said local control unit, each mean value with a corresponding predetermined value, and
- correcting, by means of said local control unit, any deviation between each mean value and the corresponding predetermined value by adjusting at least one of opening time of said at least one controllable inlet valve 26, 50, closing time of said at least one controllable inlet valve 26, 50 and/or opening time of said controllable outlet valve 27.

An advantage of this embodiment is that measurement and controlling the operation of the actuator may be performed at a local level without needing any communication with any higher level control unit such as an engine control unit.

In various example embodiments said method further comprising the steps of:
- providing an intermediate control unit in-between said local control unit and an engine control unit ECU,
- receiving, by means of said intermediate control unit, information from the engine control unit ECU,
- distributing, by means of said intermediate control unit, control signals to each local control unit in said internal combustion engine.

An advantage of this embodiment is that the complexity of the ECU may further be reduced by decentralize intelligence from said ECU to said intermediate control unit.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DESCRIPTION OF THE PREFERRED EMBODIMENTS

Figure 1:
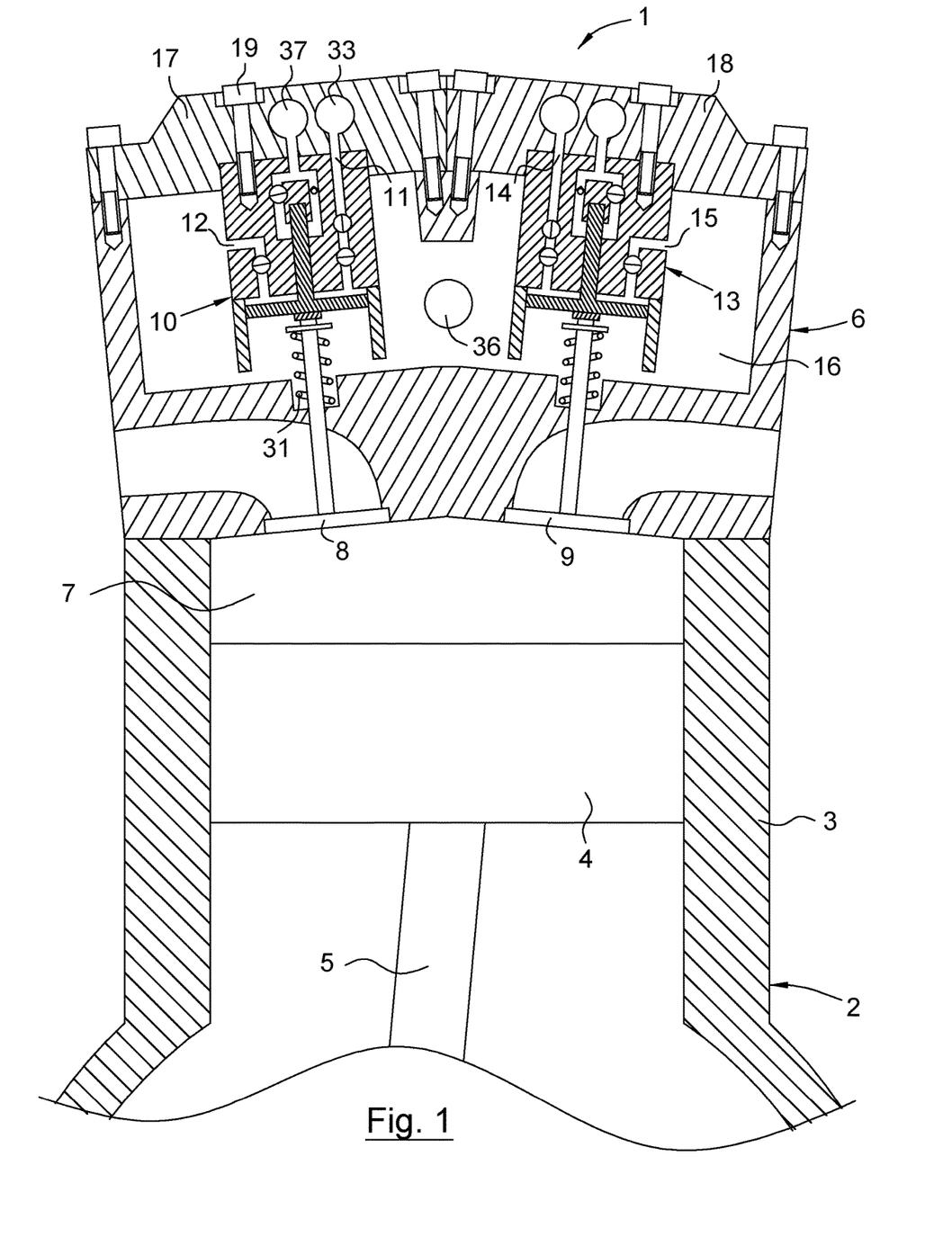
FIG. 1 is a schematic cross-sectional side view of a part of a combustion engine.

Reference is initially made to FIG. 1 that is a schematic depiction of a part of an inventive combustion engine, generally designated 1. The combustion engine 1 comprises a cylinder block 2 with at least one cylinder 3. Said cylinder block 2 may comprise one or a plurality of cylinders 3. In the shown embodiment one cylinder 3 is described, it should nevertheless be realized that the equipment described below in relation to the shown cylinder 3 is preferably applied to all of the cylinders of the combustion engine 1, in the embodiment the combustion engine comprises more cylinders.

Furthermore, the combustion engine 1 comprises a piston 4 that is axially displaceable in said cylinder 3. The movement, axial displacement forth and back, of the piston 4 is transferred on a conventional manner to a connection rod 5 connected with the piston 4, the connection rod 5 in turn is connected to and drives a crank shaft (not shown) in rotation.

The combustion engine 1 also comprises a cylinder head 6 that together with said cylinder 3 and said piston 4 delimits a combustion chamber 7. In the combustion chamber 7 the ignition of a mix of fuel and air occurs in a conventional manner and is not further described herein. The cylinder head 6 comprises a controllable first engine valve 8, also known as a gas exchange valve. In the shown embodiment, the cylinder head also comprises a controllable second engine valve 9. Said first engine valve 8 constitutes, in the shown embodiment, an inlet valve that is arranged to selectively open/close for supply of air to the combustion chamber 7. The second engine valve 9 constitutes in the shown embodiment an air outlet valve, or exhaust valve, that is arranged to selectively open/close for evacuation of exhausts form the combustion chamber 7.

The combustion engine 1 further comprises a first valve actuator 10 that is operatively connected to said first engine valve 8 and that is arranged in a closed pressure fluid circuit of the combustion engine 1. The first valve actuator 10 comprises at least one inlet opening 11 for pressure fluid and at least one outlet opening 12 for pressure fluid. The pressure fluid is a gas or a gas mixture, preferably air or nitrogen gas. Air has the advantage that it is easy to change the pressure fluid or to supply more pressure fluid if the closed pressure fluid circuit leaks, and nitrogen gas has the advantage that it lacks oxygen, which prevents oxidation of other elements.

In the shown embodiment the combustion engine 1 also comprises a second valve actuator 13 that is operatively connected to said second engine valve 9 and that is arranged in said closed pressure fluid circuit parallel with said first valve actuator 10. The second valve actuator 13 comprises at least one inlet opening 14 for pressure fluid and at least one outlet opening 15 for pressure fluid.

Each valve actuator can be operatively connected with one or more engine valves, for example the combustion engine may comprise two inlet valves which are jointly driven by the same valve actuator, however each valve actuator may drive one engine valve each to achieve the greatest possible control of the operation of the combustion engine 1.

In the description below, only the first valve actuator 10 will be described, but it should be realized that if nothing else is said, the corresponding is also true for the other valve actuator 13.

The combustion engine 1 also comprises a cylinder head chamber 16 that forms part of said closed pressure fluid circuit and that is delimited by said cylinder head 6 and at least a first cylinder head mantle 17. In the shown embodiment, a second cylinder head mantle 18 is also found that contributes to delimiting the cylinder head chamber 16. The cylinder head chamber 16 preferably presents a volume of the order of 3-10 liter, typically on the order of 5-6 liter. In an alternative embodiment, only said first cylinder head mantle 17 is present that, together with the cylinder head 6, alone delimit the cylinder head chamber 16.

At least one outlet opening 12 of the first valve actuator 10 may be in fluid communication with the cylinder head chamber 16, i.e. that the pressure fluid leaving the first valve actuator 10 via said at least one outlet opening 12 flows out in the cylinder head chamber 16.

In the shown embodiment the at least one outlet opening 15 of the second valve actuator 13 is in fluid communication with said cylinder head chamber 16, i.e. the outlet openings for pressure fluid of all the valve actuators may lead to the same cylinder head chamber.

The whole of the first valve actuator 10 may be arranged in said cylinder head chamber 16, and the first valve actuator 10 may be directly or indirectly releasably connected to said first cylinder head mantle 17, for example by a bolt 19, or similar holding means. In this embodiment, the first valve actuator 10 accordingly "hangs" in the first cylinder head mantle 17 without being in contact with the cylinder head 6. If the first valve actuator 10 should be in contact with both the first cylinder head mantle 17 and the cylinder head 6, a construction wise disadvantageous tolerance chain is achieved.

In an alternative example embodiment, the actuator 10, 13 may be directly or indirectly releasably connected to the cylinder head 6 in said cylinder head chamber 16. In such alternative embodiment the actuators 10, 13 are only in contact with the cylinder head mantle 17, 18. According to another alternative embodiment the actuators 10, 13 are not in contact with the cylinder head mantle 17, 18.

Reference is now primarily made to the FIGS. 2-7, which disclose the first valve actuator 10 in different states of operation.

The first valve actuator 10 comprises an actuator piston disc 20 and an actuator cylinder 21 delimiting a downward open cylinder volume, at least partly open. The actuator piston disc 20 divides said cylinder volume in a first upper part 22 and a second lower part 23 and is axially displaceable in said actuator cylinder 21. The actuator piston disc 20 forms part of an actuator piston generally denoted 24, that is arranged to contact and drive said first engine valve 8. The actuator piston may further comprise means 25 for play elimination in axial direction in relation to said first engine valve 8. The play eliminating means 25 may be hydraulic, and assures that when the actuator piston disc 20 is in its upper turn position, the actuator piston 24 remains in contact with the first engine valve 8 when it is closed, for the purpose of correcting for assembly tolerances, heat expansion, etc. Accordingly, the axial length of the actuator piston 24 may be adjusted by way of the play eliminating means 25. Tolerance deviations may also be corrected in conventional way using shims.

The lower part 23 of the cylinder volume of the first valve actuator 10 is in fluid communication with said cylinder head chamber 16. This way, it is guaranteed that the same pressure acts on the actuator piston disc 20 from the first/upper part 22 of the cylinder volume respective from the second/lower part 23 of the cylinder volume when the actuator piston 24 is in the upper turn position. By that, the sealing between the actuator piston disc 20 and the actuator cylinder 12 is not critical, and some leakage can be allowed for minimizing the resistance to displacement of the actuator piston disc 20, and in resting position, the actuator piston disc is not affected by changes in the low pressure level.

The first valve actuator 10 comprises a controllable first inlet valve 50 and a controllable second inlet valve 26 arranged in an inlet channel 70 and arranged to open/close said inlet channel 70, a controllable outlet valve 27 arranged in an outlet channel 60 and arranged to open/close said outlet channel 60, a hydraulic circuit, generally designated 28, that in turn comprises a non-return valve 29 arranged to allow filling of the hydraulic circuit 28, and a controllable emptying valve 30 arranged to control the emptying of the hydraulic circuit 28. The inlet channel 70 is arranged between a pressure fluid inlet opening 11 and the first portion 22 of the cylinder volume of the cylinder 21. The outlet channel 60 is arranged between a pressure fluid inlet opening 12 and the first portion 22 of the cylinder volume of the cylinder 21.

The actuator piston 24 also comprises an actuator piston rod 80 wherein the actuator piston rod 80 is arranged to guide the actuator piston 24 during axial displacement. The actuator 10 comprises an actuator piston rod opening receiving said actuator piston rod 80, wherein an upper end 85 of the actuator piston rod 80 is arranged to be displaced in the axial direction relative to said hydraulic circuit 28 in connection with axial displacement of the actuator piston disc 20 in the cylinder volume.

It should be pointed out that the controllable valves in the valve actuator 10 are schematically depicted and can for example be constituted by sliding valves, seat valves, etc. Furthermore, several of the abovementioned controllable valves may be constituted by a single body. Each valve can further be directly or indirectly electrically controlled. With directly electrically controlled is meant that the position of the valve is directly controlled by, for example, an electromagnetic device, and with indirect electrically controlled is meant that the position of the valve is controlled by a pressure fluid that in turn is controlled by, for example, an electro-magnetic device.

Figure 2:
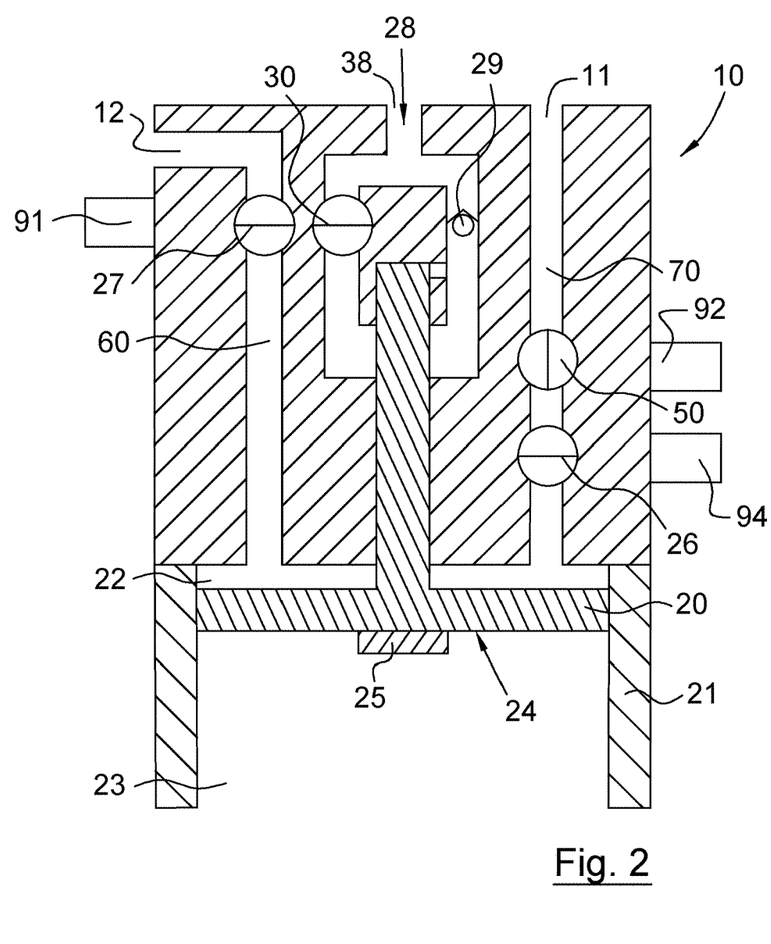
FIGS. 2, 3, 4, 5, 6 and 7 show a schematic cross-sectional side view of a valve actuator in different states.

In FIG. 2, the first valve actuator 10 is in an inactive state and ready for being set in an active state. The second controllable inlet valve 26, the controllable outlet valve 27, and the controllable emptying valve 30 of the hydraulic circuit 28 are closed. The first controllable inlet valve 50 is open. The actuator piston disc 20 is accordingly in an upper position, and the actuator piston 24 is ready to open the engine valve (not shown in FIGS. 2-7, see FIG. 1). The controllable emptying valve 30 and said controllable outlet valve 27 may be controlled simultaneously. The controllable emptying valve 30 for controlling the emptying of hydraulic fluid from the hydraulic circuit 28 and said controllable outlet valve 27 for controlling the emptying of pressure fluid from the first portion 22 of the cylinder volume, may be arranged in a single valve body unit. The controllable emptying valve 30 and said controllable outlet valve 27 may be operated by one single electromagnetic solenoid 91. The controllable first inlet valve 50, the controllable second inlet valve 26, the controllable outlet valve 27 and the controllable emptying valve 30 may be electromagnetically operated sliding valves, seating valves or ball valves. The controllable emptying valve 30 and said controllable outlet valve 27 may be arranged on a single valve shaft and may be operated by one single electromagnetic solenoid 91. Said controllable first inlet valve 50, said controllable second inlet valve 26, said controllable outlet valve 27 and said controllable emptying valve 30 may be controlled by a control unit 87. In FIG. 2 the controllable first inlet valve 50 is inactivated in its open position whereas the second controllable inlet valve 26, the controllable outlet valve 27 and the controllable emptying valve 30 are inactivated in the closed positions. This setup may help in saving consumed energy for the actuator 10 when in operation.

Figure 3:
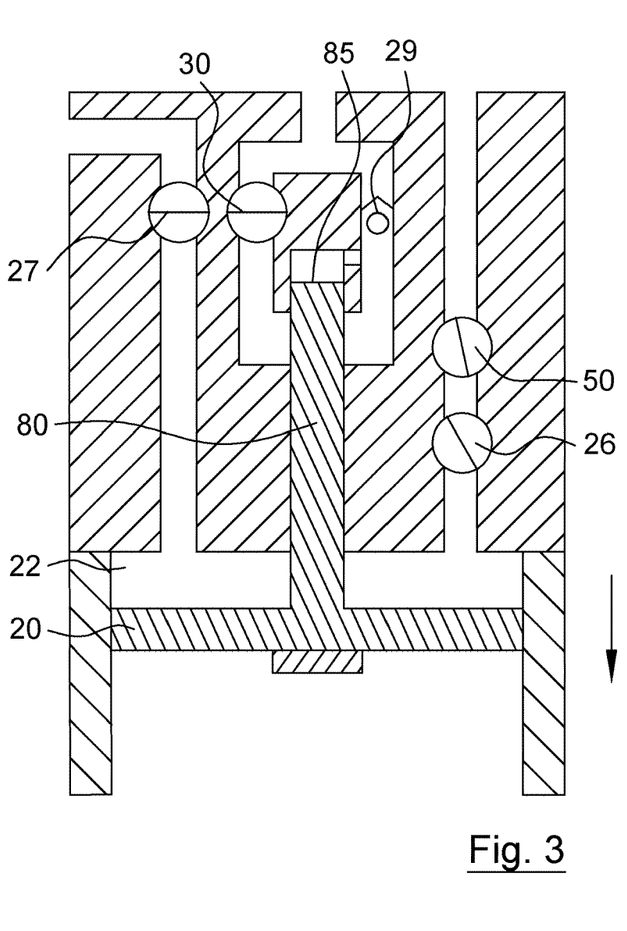

In FIG. 3, the second controllable inlet valve 26 has been opened to allow filling of pressure fluid with a high pressure to the upper part 22 of the cylinder volume, after which the actuator piston disc 20 starts a downward movement, i.e. is displaced downward, denoted by arrow in FIG. 3. The non-return valve 29 of the hydraulic circuit 28 allows for the hydraulic fluid to be sucked in and replace the volume that a piston disc rod 80 leaves. Pressure fluid can only fill the upper part 22 of the cylinder volume when said first controllable inlet valve 50 and said second controllable inlet valve 26 are open simultaneously, i.e. overlapping. Said first controllable inlet valve 50 and said second controllable inlet valve 26 may be in said open position simultaneously during a so-called overlapping time period. The overlapping time period is shorter compared to an opening time of said controllable first inlet valve 50 and compared to an opening time of said controllable second inlet valve 26. It should be noted that said first controllable inlet valve 50 and said second controllable inlet valve 26 during said overlapping time period need not be fully open, i.e., the first controllable inlet valve 50 and/or said second controllable inlet valve 26 may be partially open during said overlapping time period. By partly open means that the specific valve is in motion from fully closed to fully open, or from fully open to fully closed. The use of two valves in series in said inlet channel 70 is used for controlling the amount of pressure fluid to enter the upper part 22 of the cylinder volume. A final active position of said piston disc 20 may be defined by the overlapping time period and the pressure of the pressure fluid. In various example embodiments of the present invention said pressure of said pressure fluid is kept at a constant pressure, i.e., the final active position of said piston disc 20 is then defined by the overlapping time period only. Although the opening time for said first controllable inlet valve 50 and the opening time for said second controllable inlet valve 26 may be relatively long, said overlapping time period may be relatively short. The length of said overlapping time period may be adjusted by shifting the opening time of the first controllable inlet valve 50 relative to the opening time of said second controllable inlet valve 26. The first controllable inlet valve 50 is operated by an electromagnetic solenoid 92. The second controllable inlet valve 26 is operated by an electromagnetic solenoid 94. The overlapping time period is typically less than 3 ms. In various example embodiment said overlapping time period is between 1-2 ms.

Figure 4:
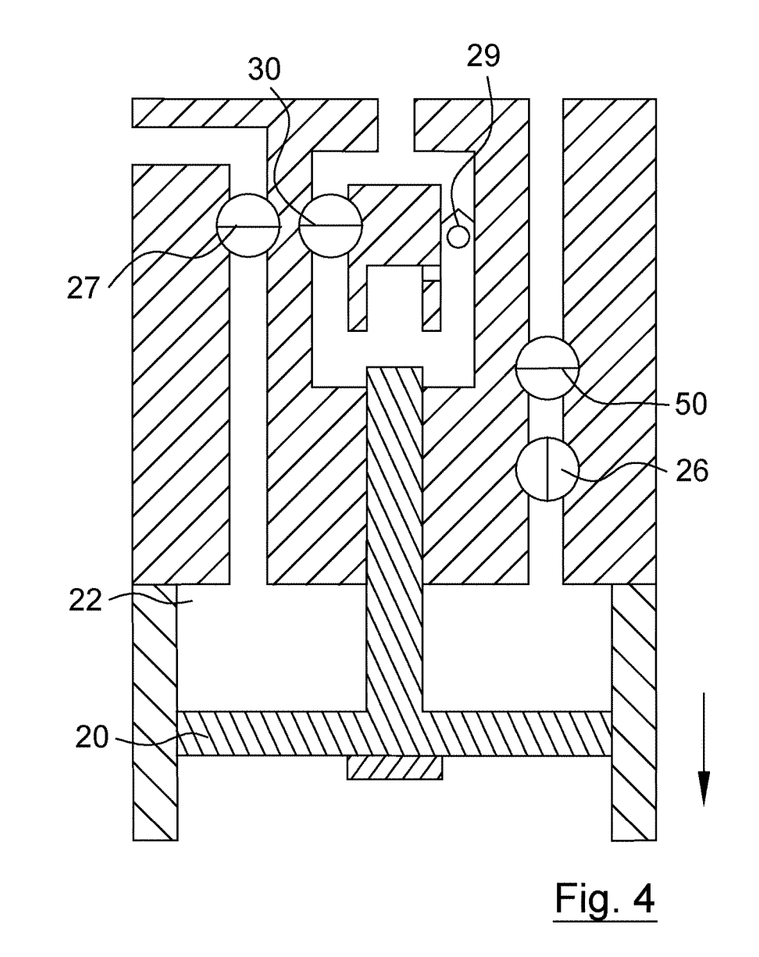

In FIG. 4, the first controllable inlet valve 50 has been closed and the pressure fluid that has entered into the upper part 22 of the cylinder volume is allowed to expand, during which the actuator piston disc 20 continues its movement downward denoted by arrow in FIG. 4. The non-return valve 29 of the hydraulic circuit 28 is still open. Although the first controllable inlet valve 50 is closed the movement of said piston disc 20 is not stopped abruptly. The movement of the piston disc 20 will continue a predetermined period of time after the inlet channel 70 has been closed due to the expansion of already entered gas in the upper part 22 of the cylinder volume.

Overlap time period scenario 1: In a first sub-step said first controllable inlet valve 50 is set in an at least partially open position and said second controllable inlet valve 26 is set to a fully closed position. In a second sub-step said second controllable inlet valve 26 is set in an at least partly opened position. In a third sub-step said first controllable inlet valve 50 is fully closed. In a fourth step said second controllable inlet valve 26 is fully closed. According to this scenario there are no high pressure gas remaining in-between the first controllable valve 50 and said second controllable valve 26 when they are both in closed position.

Overlap time period scenario 2: In a first sub-step said second controllable inlet valve 26 is set in an at least partially open position and said first controllable inlet valve 50 is set to a fully closed position. In a second sub-step said first controllable inlet valve 50 is set in an at least partly open position. In a third sub-step said second controllable inlet valve 26 is fully closed. In a fourth sub-step said first controllable inlet valve 50 is fully closed. According to this scenario there is a high pressure gas amount trapped in-between the first controllable inlet valve 50 and said second controllable inlet valve 26 when they are both in closed position. This trapped amount of high pressure gas, which can be considered to be a wasted gas volume, in-between said first controllable inlet valve 50 and said second controllable inlet valve 26 may influence the controllability of the position of the piston disc 20 in the next cycle.

Said first controllable inlet valve 50 and said second controllable inlet valve 26 may during at least a portion of the overlap time period both be located or set in a partly open position.

In an example embodiment a closing of said first controllable inlet valve 50 may be initiated before an opening of said second controllable inlet valve 26 is initiated in order to create said overlap time period. After said overlap time period the first controllable inlet valve 50 and said second controllable inlet valve 26 may return to an initial condition where said first controllable inlet valve 50 is open and said second controllable inlet valve 26 is closed.

In an example embodiment a closing of said second controllable inlet valve 26 may be initiated before an opening of said first controllable inlet valve 50 is initiated in order to create said overlap time period. After said overlap time period the first controllable inlet valve 50 and said second controllable inlet valve 26 may return to an initial condition where said first controllable inlet valve 50 is closed and said second controllable inlet valve 26 is open.

Figure 5:
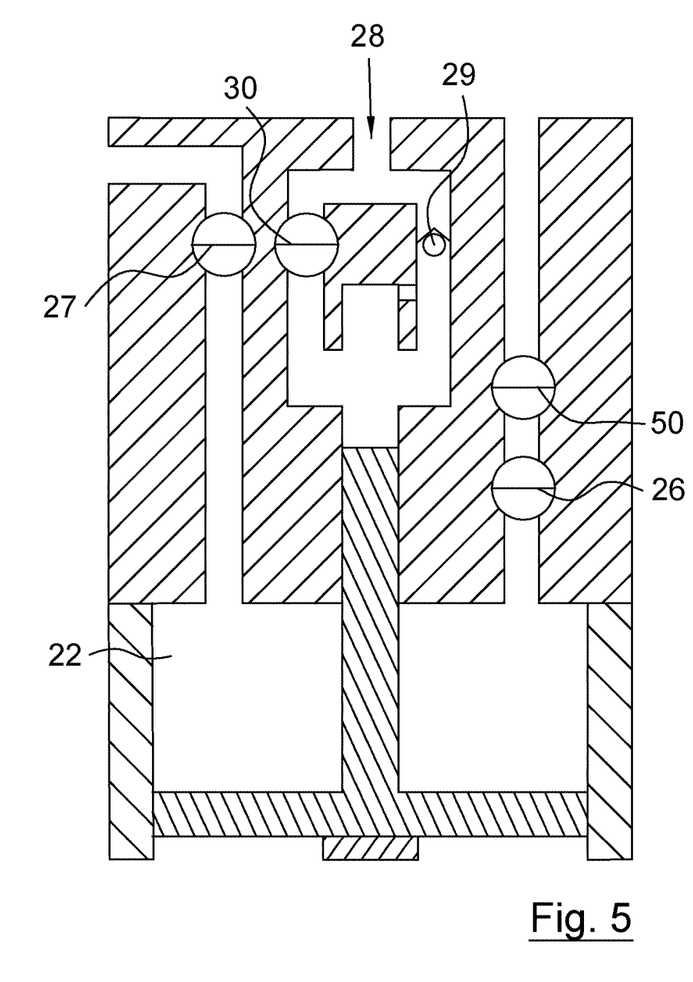

In FIG. 5, the pressure fluid in the upper part 22 of the cylinder volume is not capable of displacing the actuator piston disc 20 further. Thus, the pressure on the lower side of the actuator piston disc 20 and the return spring 31 of the first engine valve 8 may be as high as the pressure on the upper side of the actuator piston disc 20. The actuator piston disc 20 is kept in place (is locked) in its lower position a desired amount of time by the emptying valve 30 of the hydraulic circuit 28 being kept closed at the same time as the non-return valve 28 of the hydraulic circuit 28 is closed automatically. Thus, after the flow of pressure fluid in the inlet channel 70 is closed at least one of the second inlet valve 26 and the first inlet valve 50 must be fully closed.

Figure 6:
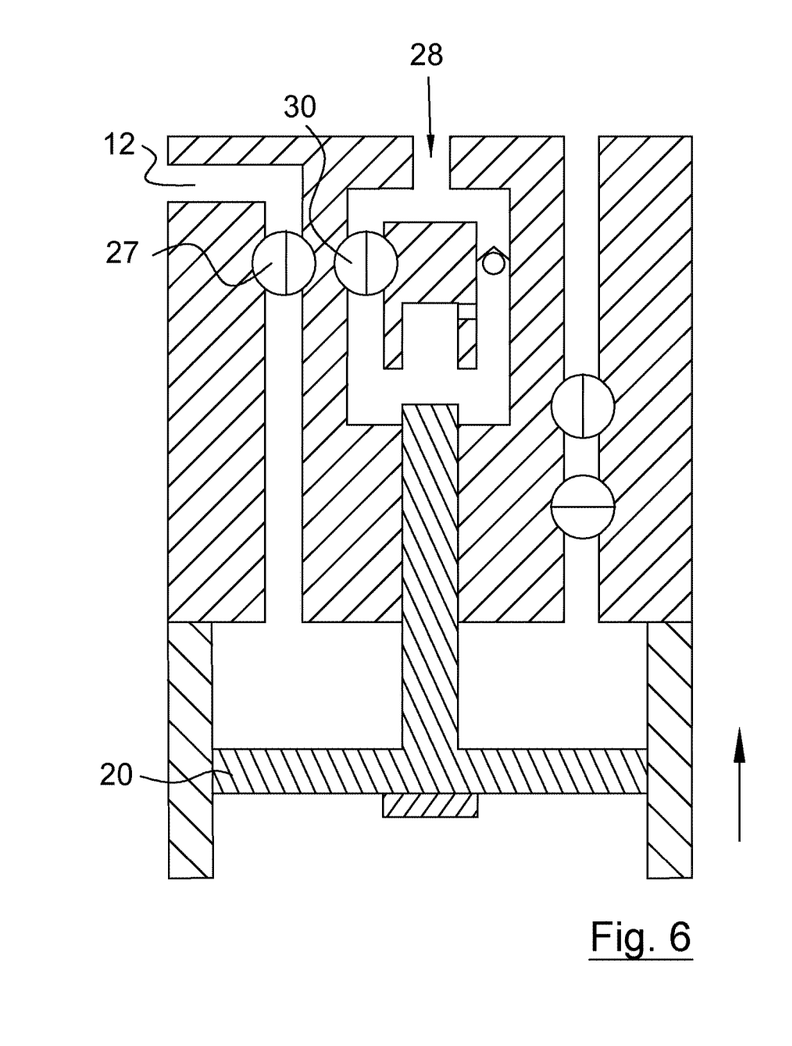

According to the disclosed embodiment the second inlet valve 26 is set in the fully closed position before the first inlet valve 50 is opened, i.e. FIG. 5, and thereafter the first inlet valve 50 is opened, i.e. FIG. 6.

In FIG. 6, the outlet valve 27 has been opened to admit an evacuation of pressure fluid from the upper part 22 of the cylinder volume, and additionally the emptying valve 30 of the hydraulic circuit 28 has been opened, after which the actuator piston disc 20 is displaced upwards, denoted by arrow in FIG. 6, when the hydraulic fluid is evacuated from the hydraulic circuit 28, and at the same time pressure fluid is evacuated from the upper part 22 of the cylinder volume to the cylinder head chamber 16.

Figure 7:
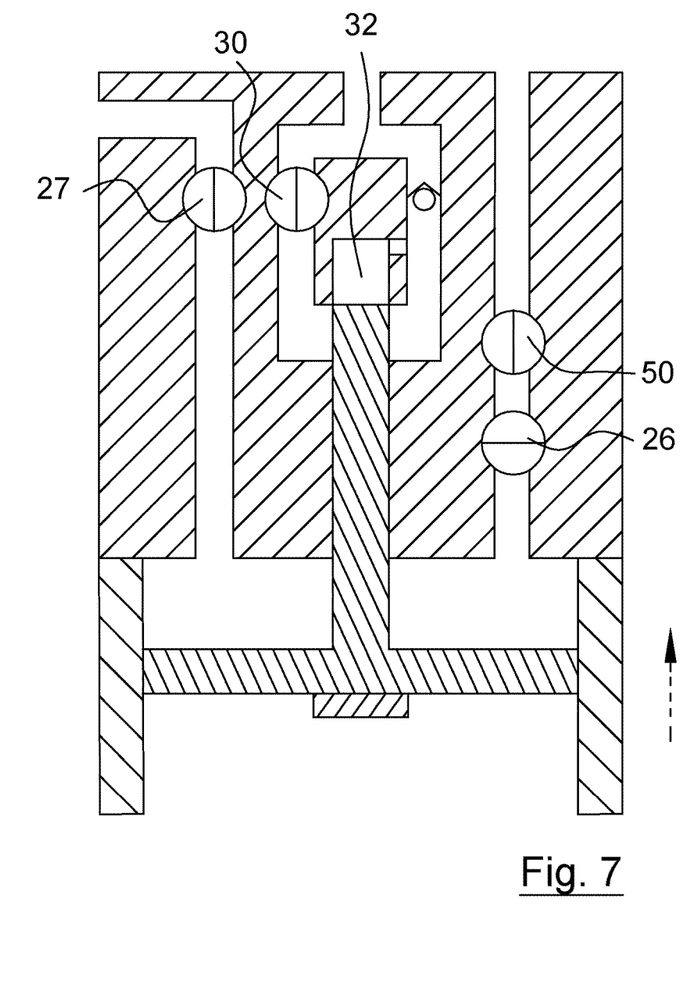

In FIG. 7, the outlet valve 27 and the emptying valve 30 of the hydraulic circuit 28 are still open, and the return movement of the actuator piston 24 may be slowed down by way of a hydraulic break means 32 incorporated in the hydraulic circuit 28.

The hydraulic fluid is preferably oil, and most preferably of the same type as the normal engine oil of the combustion engine 1.

Figure 8:
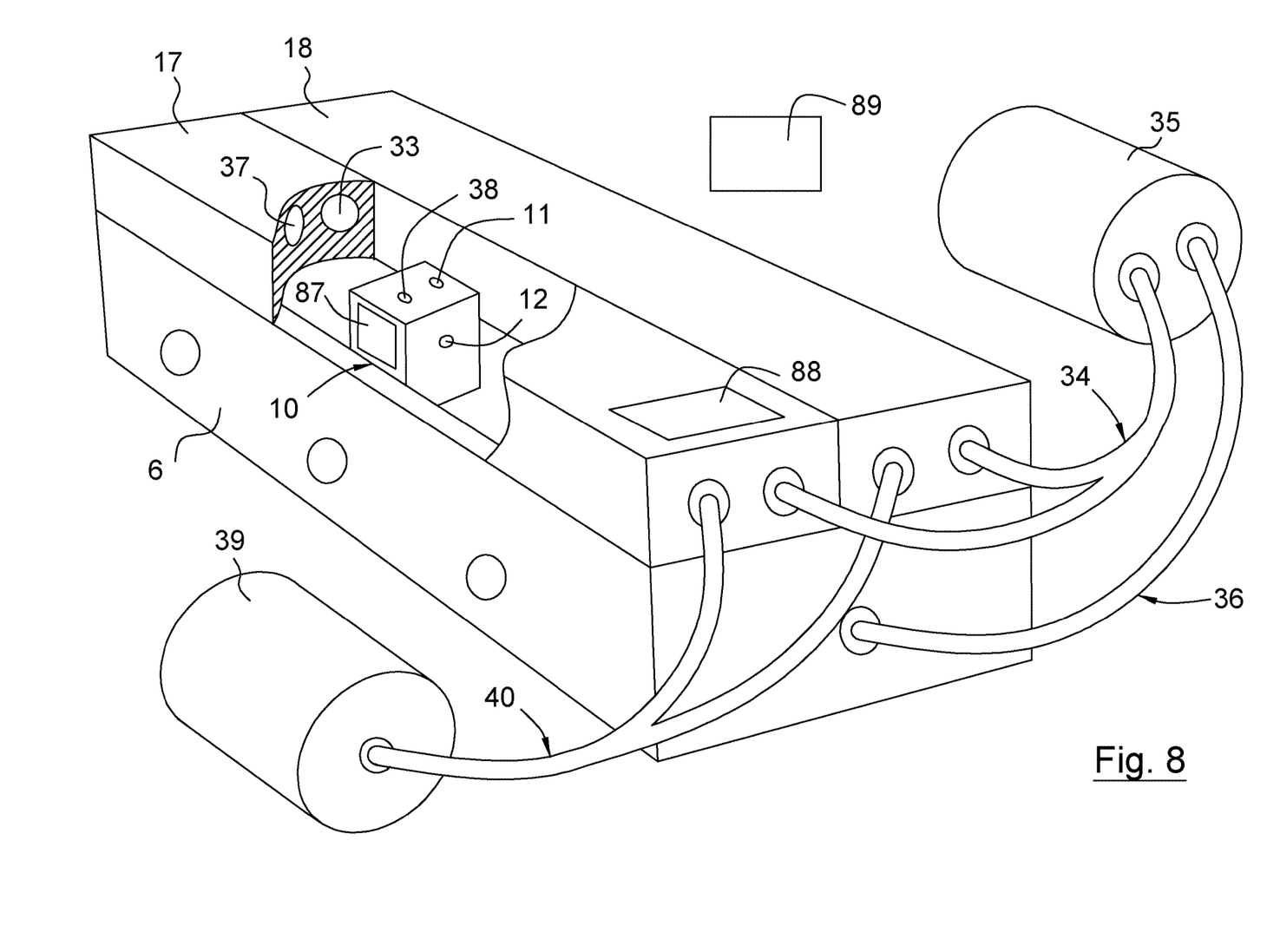
FIG. 8 is a partly cross-sectional schematic perspective view of a cylinder head and cylinder head mantles together with control units.

Reference is now made to FIG. 8, which schematically shows the cylinder head 6, the first cylinder head mantle 17 and the second cylinder head mantle 18.

The first cylinder head mantle 17 comprises a pressure fluid manifold 33 that is connected to the at least one inlet opening 11 of the first valve actuator 10. The pressure fluid manifold 33 extends along the axial length of the first cylinder head mantle 17. Said pressure fluid manifold 33 forms part of a primary pressure fluid channel 34 that extends from a compressor 35 to the at least one inlet opening 11 of the first valve actuator 10. The compressor 35 is arranged to supply a pressure fluid under high pressure to the valve actuators. Furthermore, a secondary pressure fluid channel 36 (see also FIG. 1) extends from the cylinder head chamber 16 to said compressor 35.

The volume of the primary pressure fluid channel 34, high pressure side, shall be kept as small as possible so that the temperature of the pressure fluid will sink as little as possible from the compressor 35 to the first valve actuator 10. The volume of the cylinder head chamber 16 and the secondary pressure fluid channel 36, low pressure side, shall on the other hand be maximized so that the pressure ratio between the low pressure side and the high pressure side is affected as little as possible when the compressor 35 pulls gas/pressure fluid from the low pressure side. Preferably, the volume of the cylinder head chamber 16 and the secondary pressure fluid channel 36 is at least ten times greater than the volume of the primary pressure fluid channel 34, most preferably at least 15 times greater. The actuator 10 is provided with a local control unit 87. The internal combustion engine is provided with an intermediate control unit 88 and a vehicle is provided with an engine control unit ECU 89. The relationship between said local control unit 87, the intermediate control unit 88 and said ECU and its individual tasks will be further described hereinbelow.

The compressor 35 may have a variable compressor volume/displacement, or by other means adjustable outflow, and generally the compressor 35 may be driven by the crank shaft of the combustion engine 1. At high numbers of revolutions and high torque output, higher pressure of the pressure fluid in the primary pressure fluid channel 34 may be required, and at low numbers of revolutions and low torque output, lower pressure of the pressure fluid in the primary pressure fluid channel 34 may be required.

The pressure level on the high pressure side in in the order of 8-30 bar to, with sufficient speed, open an inward opening engine valve where a high counter pressure is present in the combustion chamber, and the pressure level on the low pressure side is in the order of 4-8 bar to hold the pressure ratio below 1:4, preferably below 1:3. The aim is to hold the temperature of the pressure fluid in the primary pressure fluid channel 34 below 120° C. under normal operation for avoiding oxidizing a hydraulic fluid mist that is present in the pressure fluid, however temperatures up to 150° C. can be allowed for short periods.

The first cylinder head mantle 17 further comprises a hydraulic liquid manifold 37 that is connected to an inlet opening 38 of said hydraulic circuit 28 of the first valve actuator 10. The hydraulic liquid manifold 37 extends along the axial length of the first cylinder head 17, parallel to the pressure fluid manifold 33. A pump 39, or the like, is arranged to supply a pressurized hydraulic liquid to the hydraulic liquid manifold 37 via a conduit 40.

The first cylinder head mantle 17 may further comprise all necessary electric infrastructure (not shown) for, among other things, controlling the first valve actuator 10, for various sensors, etc.

In conventional combustion engines 1, the first engine valve 8 (air supply valve) and the second engine valve 9 (exhaust valve) may be arranged at an angle in relation to one another, i.e. their respective valve shafts may point in different directions in relation to the engine cylinders 3, and the first valve actuator 10 must be arranged in line with the first shaft of the first engine valve 8 to achieve optimum operation. As a result of the relative separating orientation and of the valve actuators being connected with respective cylinder head mantle before these are mounted on the cylinder head 6, it is preferable that the first cylinder head mantle 17 is applied on the cylinder head 6 in line with the shaft of the first engine valve 8 and that the second cylinder head mantle 18 is applied on the cylinder head 6 in line with the shaft of the second engine valve 9.

Figure 9:
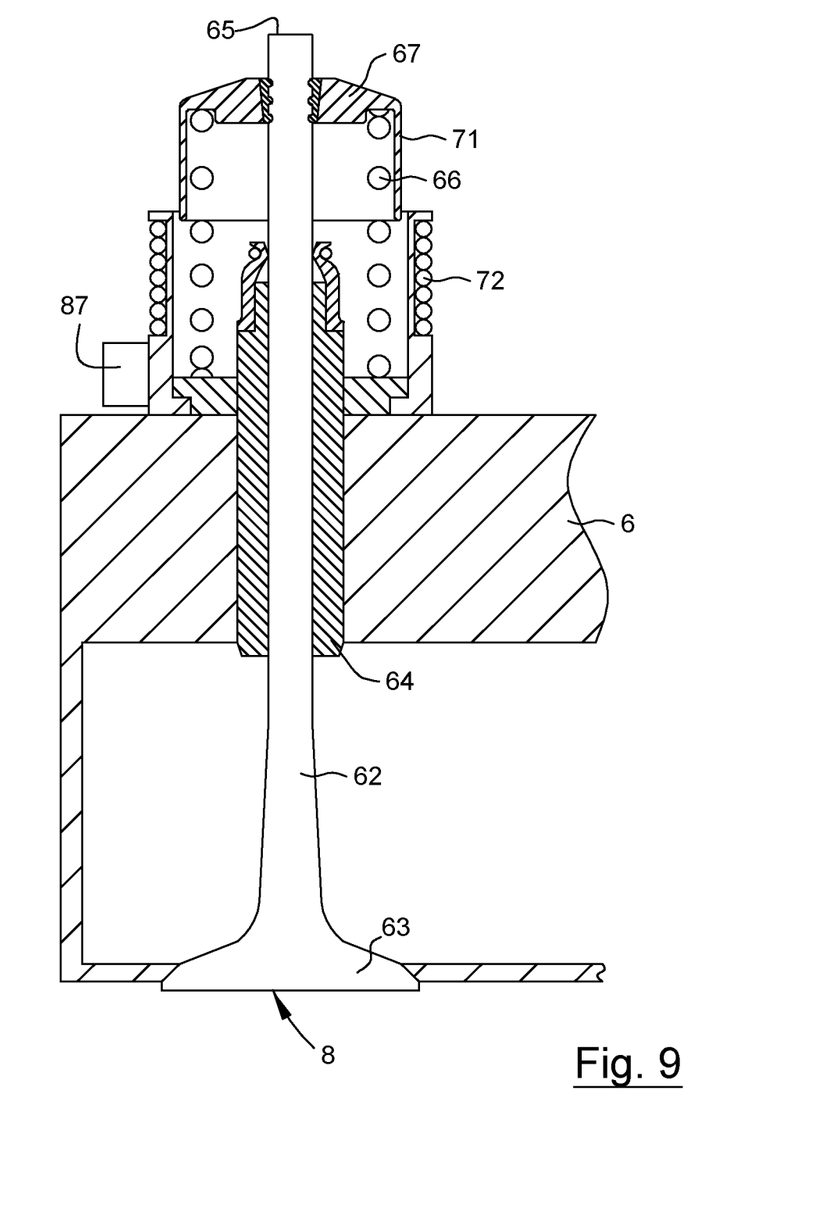
FIG. 9 is a schematic cross-sectional view of a valve connected to a position sensor assembly, having the valve in closed state.
Figure 10:
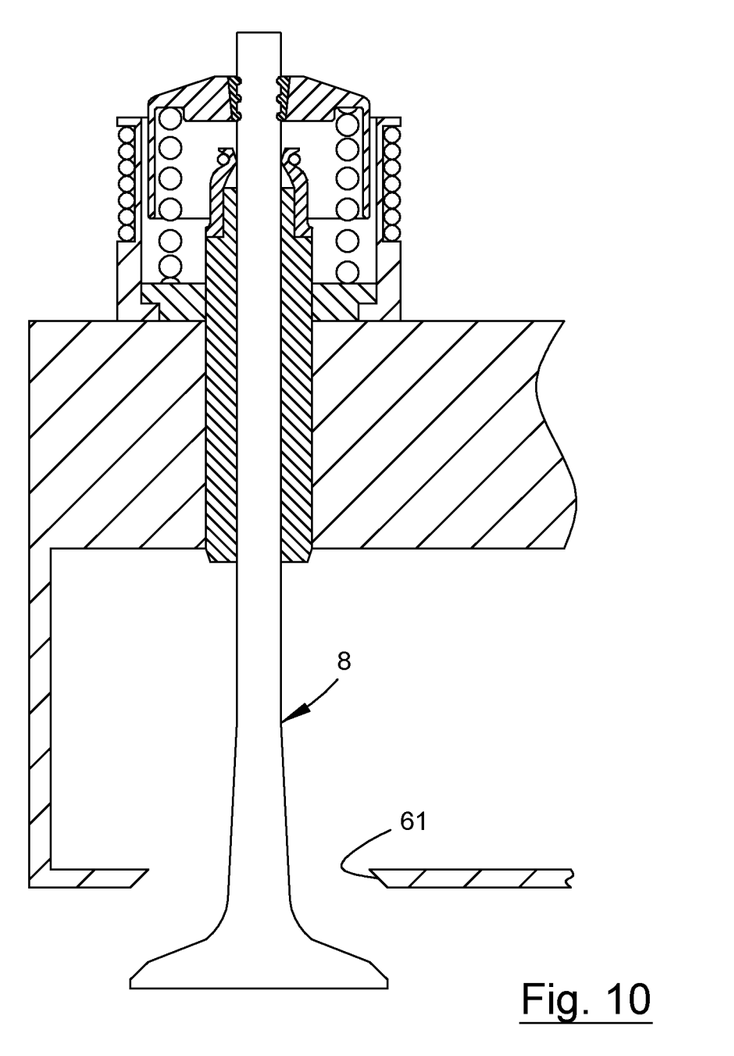
FIG. 10 is a schematic cross-sectional view of the valve in FIG. 9, having the valve in open state.

Reference is now made to FIGS. 9 and 10, which show an example embodiment of a position sensor of a gas exchange valve of an internal combustion engine. The position sensor assembly may be used for determining a mutual position between a first object and a second object. In the application shown in FIGS. 9 and 10, said first object is a gas exchange valve 8 and said second object is a valve seat 61, which are disposed in an internal combustion engine. Hereinbelow, the position sensor will be described in connection with the determination of mutual position between a valve 8 and a valve seat 61 without being limited thereto. The gas exchange valve 8 is reciprocally displaceable in the axial direction between a closed position, FIG. 9, and an open position, FIG. 10. It should be pointed out that the valve 8 may be an inlet valve as well as an outlet valve in one of the cylinders of the internal combustion engine.

The valve 8 has a valve stem 62 and a valve head 63. The valve stem 62 extends through and is guided by a valve stem guide 64 and the valve head 63 is arranged to interact with said valve seat 61 for alternately permitting and preventing, respectively, passage of gas. The valve stem seal 64 is arranged in a through hole in a stationary part, cylinder head 6, of the combustion engine. The valve 8 may be displaceable by means of a pneumatic and/or hydraulic actuator 10 (not shown), which acts on an upper end 65 of the valve stem 62 of the valve 8 to displace the valve 8 from the closed position thereof to the open position thereof. Furthermore, the internal combustion engine may comprise a conventional, schematically shown, valve spring 66, which is arranged to bring back the valve 8 from the open position thereof to the closed position thereof. The valve spring 66 acts in the lower end thereof directly or indirectly against the stationary part of the combustion engine, and in the upper end thereof against a carrier 67, or valve spring retainer, which is connected to the valve stem 62 in the area of the upper end 65 thereof.

A position sensor assembly is arranged to determine the mutual position between the valve 8 and the valve seat 61, i.e. determine where the valve 8 is and to which degree the valve opening of the valve seat 61 is open, or in other words the present valve lift.

The position sensor assembly may comprise a first body 71 connectable to said valve 8, a coil or inductor 72 connectable to said valve seat 61.

The position sensor assembly may operate in the following way. When the valve 8 is displaced in relation to the valve seat 61, in order to let in or out gas from the cylinder of the combustion engine, also the first body 71 is displaced in relation to the coil 72. When the overlap between the first body 71 and the coil 72 increases, the time elapsed for the measuring voltage to be changed a predetermined value decreases in proportion thereto, as a consequence of the coil 72 being short-circuited to different degrees by the impact from the first body 71. The duration of change may approximately be 5.5 μs at 0 mm overlap, approximately 4.0 μs at 5 mm overlap, and approximately 2.8 μs at 10 mm overlap.

Reference is primarily made to FIG. 8. The actuator 10 may further have a local control unit 87 associated with said actuator 10. The local control unit 87 may be operatively connected to said at least one controllable inlet valve 26, 50 and said controllable outlet valve 27 of the actuator 10 and operatively connected to said position sensor arrangement. The local control unit may also be configured for receiving information from an engine control unit ECU 89 and/or an intermediate control unit 88. Said cylinder head mantle 17 may comprise the communication cables (or circuit line) between said local control unit(s) 87 and said intermediate control unit 88.

The local control unit 87 may be configured for controlling the opening and closing of said at least one controllable inlet valve 26, 50 and said at least one controllable outlet valve 27 by operating respective electromagnetic solenoids 91, 92, 94.

The local control unit 87 may also be configured for determining a measured value of at least one of:

time of opening of said at least one gas exchange valve of said internal combustion engine,
time of closing of said at least one gas exchange valve of said internal combustion engine, and
lift height of said at least one gas exchange valve of said internal combustion engine.

Said measured value may be a mean value, median value, type value, or another value representing the rime of opening, time of closing and/or lift height. Said measured value, e.g. mean value, median value or type value, may be based on 2-30 events, wherein one event comprises at least one opening and closing of said at least one gas exchange valve of said internal combustion engine.

The local control unit 87 may be configured to compare each measured value with a corresponding predetermined value, wherein said local control unit 87 is configured to correct any deviation between each measured value and the corresponding predetermined value by adjusting at least one of opening time of said at least one controllable inlet valve 62, 50, closing time of said at least one controllable inlet valve 26, 50 and/or opening time of said at least one controllable outlet valve 27.

The position sensor arrangement for determining the position of said at least one gas exchange valve of said internal combustion engine may be an inductive sensor, a capacitive sensor, an eddy current sensor and/or a mechanical sensor.

The information from the engine control unit ECU 89 may comprise at least predetermined values for time of opening, time of closing and lift height of said at least one gas exchange valve of said internal combustion engine.

The pressure fluid outlet 12 may be arranged for directing pressure fluid onto said local control unit 87 for cooling the same.

The intermediate control unit 88 arranged in between said local control unit 87 and said engine control unit ECU 89. The intermediate control unit 88 is configured for providing said local control units with identifiers for use in further communication between ECU 89 and local control unit 87 via said intermediate control unit 88 when operating the internal combustion engine.

When the local control units 87 have been assigned with unique identifiers from said intermediate control unit 88, the intermediate control unit 88 may send out all operating information to all local control units 87 together with said identifiers. In this way the information from the ECU 89 is tagged with identifiers at the intermediate control unit. The intermediate control unit distribute all tagged information to all local control units 87. Any local control unit 87 responds only to information which is correctly tagged, i.e. comprises the correct identifier for the specific local control unit 87.

The use of a local control unit 87, an intermediate control unit 88 and an engine control unit 89 will reduce noise and shorten the distance between control activities and actuators. The control activity in the local control unit 87 for sensing, determining and adapting the opening time, closing time and lift height of said at least one gas exchange valve will reduce interference signals and will also speed up the communication between the actuator 10 and said control functionality now provided in said local control unit close to the actuator 10. By using an intermediate control unit 88 in between said local control unit 87 and said engine control unit 89 will make the source code for the operation of the internal combustion engine in said engine control unit 89 easier to implement. In addition, as a further advantage, if any local control unit 87 need to be exchanged for any reason, the source code in said engine control unit 89 need not be amended for allowing such new hardware to be in an operable state. The new local control unit 87 will be identified by the intermediate control unit 88 as a "new" unit and identified accordingly. When the "new" unit has been identified and been provided with a unique identifier, such "new" unit may be used in the operation of the internal combustion engine as did the unit it was exchanged with. The local control unit 87, the intermediate control unit 88 and the engine control unit may exchange information on a so-called CAN-bus. In various example embodiments the entire or part of the local control unit 87 is attached to said actuator 10. In various example embodiments said local control unit 87 comprises a printed circuit board PCB onto which at least one electromagnetic solenoid 91, 92, 94 may be attached. In various example embodiments said local control unit 87 may be provided in close vicinity to corresponding actuator 10. In various example embodiments said local control unit 87 may have functionality split in at least two PCB arranged in close vicinity to the corresponding actuator and/or attached to said actuator. In various example embodiments a measuring functionality for receiving/sending measuring signals from one or a plurality of sensors provided on said actuator 10 may be arranged on a first PCB and a comparing unit for comparing actual measuring data with predetermined data may be arrange on a second PCB.

Instead of, as in prior art, having one synchronization bus line to all actuators which will require ID to be hard coded into the engine control unit, a distributed synchronization line system that also doubles as an ID distribution system may be used. A CAN-bus connected microcontroller, VACS, hereinabove referred to as the intermediate control unit, may be responsible for the synchronization and ID signal. At power on, this intermediate control unit may detect the presence of each actuator by detecting a pull-up voltage on each synchronization line. The intermediate control unit will then send serially encoded messages with ID information to each actuator, i.e., to the local control unit. When an actuator has received and processed this information it will send a CAN message to the engine control unit. When all actuators have reported a successful ID reception the engine control unit will message the intermediate control unit which will put itself into a synchronization distribution mode. From that point on any synchronization signal will be broadcast to all actuators through the intermediate control unit. The intermediate control unit may also supply termination for the CAN bus and verify that the CAN bus is working properly. There may also be possible for the intermediate control unit to monitor the synchronization lines to detect any problem with any one of the actuators.

Conceivable Modifications of the Invention

The invention is not limited to only the abovementioned and embodiments shown in the drawings, which only have an illustrating and exemplifying purpose. This patent application is intended to cover all modifications and variants of the preferred embodiments described herein, and the present invention is consequently defined by the wording of the enclosed claims and the equipment can thus be modified in all conceivable ways within the framework of the enclosed claims.

It should also be pointed out that all information about/ concerning terms such as above, below, upper, lower, etc. shall be interpreted/read with the equipment oriented in accordance with the figures, with the drawings oriented in such a way that the reference numbers can be read in a correct manner. Consequently, such terms indicate only relative relationships in the shown embodiments, which relationships can be changed if the equipment according to the invention is provided with another construction/design.

It should be pointed out that even if it is not explicitly stated that features from a specific embodiment can be combined with the features of another embodiment, this should be regarded as obvious when so is possible.

The invention claimed is:

1. An internal combustion engine comprising:
an actuator for axial displacement of at least one gas exchange valve of said internal combustion engine, wherein said actuator comprises:
an actuator piston disc,
a cylinder volume adapted for said actuator piston disc, wherein said actuator piston disc divides said cylinder volume in a first portion and a second portion, wherein said actuator piston disc is movably arranged in an axial direction between a rest position and an active position,
an actuator piston rod connected to said actuator piston disc for guiding said actuator piston disc in an axial direction,
an inlet channel arranged between a pressure fluid inlet and the first portion of the cylinder volume,
at least one controllable inlet valve arranged in said inlet channel,
an outlet channel arranged between said first portion of the cylinder volume and a pressure fluid outlet,
a controllable outlet valve arranged in said outlet channel,
a position sensor arrangement associated with said actuator, wherein the position sensor arrangement is configured for determining the position of said at least one gas exchange valve, said at least one gas exchange valve being displaced by the movement of said actuator piston disc, and
a local control unit associated with said actuator, wherein the local control unit is operatively connected to said at least one controllable inlet valve and said controllable outlet valve of the actuator and operatively connected to said position sensor arrangement, the entire or part of the local control unit is attached to said actuator or in close vicinity to said actuator, the local control unit is configured for controlling the opening and closing of said at least one controllable inlet valve and said at least one controllable outlet valve by operating respective electromagnetic solenoids, wherein said local control unit is configured for receiving information from an engine control unit ECU.

2. The internal combustion engine according to claim 1, wherein said local control unit is configured for controlling the opening and closing of said at least one controllable inlet valve and said at least one controllable outlet valve.

3. The internal combustion engine according to claim 2, wherein said local control unit is configured for determining a measured value of at least one of:
time of opening of said at least one gas exchange valve of said internal combustion engine,
time of closing of said at least one gas exchange valve of said internal combustion engine, and
lift height of said at least one gas exchange valve of said internal combustion engine.

4. The internal combustion engine according to claim 2, wherein said position sensor arrangement for determining the position of said at least one gas exchange valve of said internal combustion engine is an inductive sensor, a capacitive sensor, an eddy current sensor and/or a mechanical sensor.

5. The internal combustion engine according to claim 2, wherein said information from the engine control unit ECU comprises at least predetermined values for time of opening, time of closing and lift height of said at least one gas exchange valve of said internal combustion engine.

6. The internal combustion engine according to claim 1, wherein said local control unit is configured for determining a measured value of at least one of:
time of opening of said at least one gas exchange valve of said internal combustion engine,
time of closing of said at least one gas exchange valve of said internal combustion engine, and
lift height of said at least one gas exchange valve of said internal combustion engine.

7. The internal combustion engine according to claim 6, wherein said measured value is a mean value, median value or type value based on 2-30 events, wherein one event comprises at least one opening and closing of said at least one gas exchange valve of said internal combustion engine.

8. The internal combustion engine according to claim 7, wherein said local control unit is configured to compare each measured value with a corresponding predetermined value, wherein said local control unit is configured to correct any deviation between each measured value and the corresponding predetermined value by adjusting at least one of opening time of said at least one controllable inlet valve, closing time of said at least one controllable inlet valve and/or opening time of said at least one controllable outlet valve.

9. The internal combustion engine according to claim 8, wherein said position sensor arrangement for determining the position of said at least one gas exchange valve of said internal combustion engine is an inductive sensor, a capacitive sensor, an eddy current sensor and/or a mechanical sensor.

10. The internal combustion engine according to claim 7, wherein said position sensor arrangement for determining the position of said at least one gas exchange valve of said internal combustion engine is an inductive sensor, a capacitive sensor, an eddy current sensor and/or a mechanical sensor.

11. The internal combustion engine according to claim 6, wherein said position sensor arrangement for determining the position of said at least one gas exchange valve of said internal combustion engine is an inductive sensor, a capacitive sensor, an eddy current sensor and/or a mechanical sensor.

12. The internal combustion engine according to claim 6, wherein said information from the engine control unit ECU comprises at least predetermined values for time of opening, time of closing and lift height of said at least one gas exchange valve of said internal combustion engine.

13. The internal combustion engine according to claim 1, wherein said position sensor arrangement for determining the position of said at least one gas exchange valve of said internal combustion engine is an inductive sensor, a capacitive sensor, an eddy current sensor and/or a mechanical sensor.

14. The internal combustion engine according to claim 1, wherein said information from the engine control unit ECU comprises at least predetermined values for time of opening, time of closing and lift height of said at least one gas exchange valve of said internal combustion engine.

15. The internal combustion engine according to claim 1, further comprising an intermediate control unit arranged in-between said local control unit and said engine control unit ECU, wherein said intermediate control unit is configured for receiving information from the engine control unit ECU and for distributing control signals to each local control unit of said internal combustion engine.

16. The internal combustion engine according to claim 1, wherein said pressure fluid outlet is arranged for directing pressure fluid onto said local control unit for cooling the same.

17. A vehicle comprising an internal combustion engine according to claim 1, arranged to provide propulsion of said vehicle.

18. A method for controlling an internal combustion engine comprising an actuator for axial displacement of at least one gas exchange valve of said internal combustion engine, wherein said actuator comprises:
- an actuator piston disc,
- a cylinder volume adapted for said actuator piston disc, wherein said actuator piston disc divides said cylinder volume in a first portion and a second portion, wherein said actuator piston disc is movably arranged in an axial direction between a rest position and an active position,
- an actuator piston rod connected to said actuator piston disc for guiding said actuator piston disc in an axial direction,
- an inlet channel arranged between a pressure fluid inlet and the first portion of the cylinder volume,
- at least one controllable inlet valve arranged in said inlet channel,
- an outlet channel arranged between said first portion of the cylinder volume and a pressure fluid outlet,
- a controllable outlet valve arranged in said outlet channel, said method comprising the steps of:
- determining, by means of a position sensor arrangement associated with said actuator, the position of said at least one gas exchange valve, said at least one gas exchange valve being displaced by the movement of said actuator piston disc,
- determining, by means of a local control unit associated with said actuator, a measured value of at least one of:
  - time of opening of said at least one gas exchange valve of said internal combustion engine,
  - time of closing of said at least one gas exchange valve of said internal combustion engine, and
  - lift height of said at least one gas exchange valve of said internal combustion engine,
- comparing, by means of said local control unit, each mean value with a corresponding predetermined value, and
- correcting, by means of said local control unit, any deviation between each mean value and the corresponding predetermined value by adjusting at least one of opening time of said at least one controllable inlet valve, closing time of said at least one controllable inlet valve and/or opening time of said controllable outlet valve.

19. The method according to claim 18, further comprising the step of
cooling said local control unit by using the pressure fluid emanating from the pressure fluid outlet of said actuator.

20. The method according to claim 18, further comprising the steps of
- providing an intermediate control unit in-between said local control unit and an engine control unit ECU,
- receiving, by means of said intermediate control unit, information from the engine control unit ECU, and
- distributing, by means of said intermediate control unit, control signals to each local control unit in said internal combustion engine.

\* \* \* \* \*